United States Patent [19]
Zentz, Jr.

[11] 3,850,653
[45] *Nov. 26, 1974

[54] METHOD FOR PROCESSING KAOLIN CLAY PIGMENT AND IMPROVED PRODUCT THEREOF

[75] Inventor: William E. Zentz, Jr., Iselin, N.J.

[73] Assignee: Engelhard Minerals and Chemicals Corporation, Woodbridge, N.J.

[*] Notice: The portion of the term of this patent subsequent to Apr. 3, 1990, has been disclaimed.

[22] Filed: Jan. 16, 1973

[21] Appl. No.: 324,109

Related U.S. Application Data

[63] Continuation-in-part of Ser. Nos. 116,219, Feb. 17, 1971, Pat. No. 3,725,100, and Ser. No. 263,560, June 16, 1972, abandoned, said Ser. No. 116,219, is a continuation-in-part of Ser. No. 813,277, April 3, 1969, abandoned, and Ser. No. 887,384, Dec. 22, 1969, abandoned, said Ser. No. 263,560, is a continuation-in-part of Ser. No. 116,219.

[52] U.S. Cl............................. 106/288 B, 106/72

[51] Int. Cl. ..................... C08h 17/06, C08k 1/12
[58] Field of Search ......................... 106/288 B, 72

[56] References Cited
UNITED STATES PATENTS

| | | | |
|---|---|---|---|
| 3,320,027 | 5/1967 | Maynard et al...................... | 106/72 |
| 3,337,048 | 8/1967 | Mercade.............................. | 106/72 |
| 3,674,521 | 7/1972 | Noble .................................. | 106/72 |
| 3,725,100 | 4/1973 | Zentz.................................. | 106/72 |

Primary Examiner—Delbert E. Gantz
Assistant Examiner—J. V. Howard
Attorney, Agent, or Firm—Melvin C. Flint; Inez L. Moselle

[57] ABSTRACT

Small amounts of colorless sources of polyvalent metal cations and borate ions are added to particles of a kaolin clay pigment in the presence of water at an acidic pH before deflocculating the clay. This improves the opacifying power of the clay when it is used as a coating on paper.

13 Claims, No Drawings

METHOD FOR PROCESSING KAOLIN CLAY PIGMENT AND IMPROVED PRODUCT THEREOF

RELATED APPLICATIONS

This application is a continuation-in-part of the following copending applications:

Ser. No. 116,219 * filed Feb. 17, 1971, now U.S. Pat. No. 3,725,100,

Ser. No. 263,560 ** filed June 16, 1972, now abandoned.

* Continuation-in-part of Ser. No. 813,277, filed Apr. 3, 1969, now abandoned; and Ser. No. 887,384, filed Dec. 22, 1969, now abandoned.

** Continuation-in-part of Ser. No. 116,219.

BACKGROUND OF THE INVENTION

Finely divided refined kaolin clay is widely used as a pigment to provide a smooth, glossy white opaque surface finish on quality printing paper. The clay is applied as an aqueous "coating color" which comprises clay pigment, deflocculating agent for the clay and suitable adhesive such as latex, starch or mixtures of latex with protein. Present-day coatings are applied at high machine speeds which necessitate the use of high solids coating colors. The formulation of coating colors at high solids requires the initial provision of fluid high solids clay-water suspensions. These suspensions are subsequently mixed with adhesive dispersions or suspensions to prepare the coating colors. High solids clay-water suspensions generally contain in excess of 65 percent clay solids (65 parts by weight dry clay to 35 parts by weight water). A strong deflocculating agent, conventionally a sodium condensed phosphate salt, must be present in the high solids suspensions in order to impart fluidity since the systems would be solid or solid masses in the absence of a powerful deflocculating agent. The step of preparing such deflocculated suspensions is generally referred to as "makedown".

Kaolin clay pigments must meet certain requirements with regard to rheological properties and to the properties of the coated sheet material. The apparent viscosity of the initial high solids deflocculated suspension of the clay coating pigment must be sufficiently low to permit mixing and pumping. After adhesive is incorporated, the resulting coating color must have suitable viscosity for handling and application to the paper. The coating should be as white, bright and smooth as possible. In addition, it is highly desirable to obtain a coated calendered sheet which is as opaque as possible since the opacity of the coated sheet has a significant effect on the appearance of the printed sheet. Normally high gloss is desirable. Adequate resistance to pick is also necessary.

Kaolin coating pigments are usually obtained by wet processing methods. The wet processing normally includes a reducing bleach treatment which is applied to an acidic, flocculated pulp of the clay and is followed by filtration and washing. To provide "predispersed" kaolin pigments, the washed filter cakes are fluidized by addition of a suitable dispersing (deflocculating) agent. The fluidized filter cake may be spray dried to provide predispersed microspheres. Alternatively, the solids content of the fluidized cake may be adjusted to a desired level by further addition of clay and dispersant to provide a deflocculated clay suspension or slip which is shipped in that form. Acid kaolin clay pigments are obtained by pulverizing the dried acidic filter cake without addition of a dispersant. During makedown the acidic pigments are deflocculated in water, usually with a condensed phosphate salt.

In order to improve the opacity of kaolin films, it has been considered necessary to incorporate with the clay a pigment having a higher refractive index than that of clay. Titania is generally the opacifying pigment of choice. The disadvantage of using titania to increase the opacity of clay pigmented coatings is that the use of an effective quantity of titania adds significantly to raw material costs. It would obviously be advantageous for reasons of economy alone to increase the opacifying properties of the kaolin clay pigment during processing, provided that the resulting pigment could be formed into a deflocculated high solids suspension and coating composition having satisfactory rheological properties.

THE INVENTION

An object of the invention is to provide a method for improving the opacity of kaolin clay pigmented coatings without impairing other desirable properties of the clay.

Another object is to provide a simple modification in the conventional wet processing of kaolin clay pigment which results in an improvement in various pigmenting properties of the clay, the improvements including increased opacity of the clay-coated substrates.

Another object is to provide deflocculated kaolin clay pigments characterized by improved opacity and, in some cases, improved gloss, pick resistance and/or increased pigment brightness.

The present invention relates to a kaolin clay coating pigment including particles of kaolin clay containing an added colorless source of polyvalent cations and an added colorless source of borate ions in amounts sufficient to improve the opacity of the clay but insufficient to neutralize or deflocculate the clay. The invention relates also to a predispersed form of such clay coating pigment which also includes a clay dispersant, especially a condensed phosphate salt, added to the clay after adding both a source of borate ions and a source of polyvalent cations.

The present invention also relates to a method for producing an improved kaolin clay coating pigment which comprises adding to an acidic flocculated aqueous suspension of kaolin clay a colorless source of polyvalent cations and a colorless source of borate ions in amounts sufficient to improve the opacity of the clay but insufficient to neutralize or to deflocculate the clay, the clay being capable after such additions of being deflocculated with a clay dispersant. The invention relates also to a method for producing an improved predispersed kaolin clay coating pigment by adding a clay dispersant to kaolin clay previously treated with added polyvalent cations and borate ions, as described herein.

In a preferred embodiment of the method of the invention, the sources of polyvalent cations and the borate ions are both incorporated into an acidic suspension of kaolin clay before the suspension is filtered, washed and deflocculated. In an especially preferred embodiment, disclosed and claimed in U.S. Pat. No. 3,725,100, the source of polyvalent cations is a zinc compound, preferably zinc hydrosulfite, used to bleach the acidic pulp of clay, and the source of borate ions, which is added to the bleached pulp before the pulp is filtered and washed, is an alkali metal borate salt, ammonium borate or boric acid.

PRIOR ART

I am aware of the fact that it has been suggested to brighten clay by adding sufficient alkali to an acidic slip of zinc hydrosulfite bleached kaolin to effect thickening of the slip and that borax was mentioned as a suitable alkali. The improved clay color was attributed to precipitation of zinc hydroxide which takes place at the time thickening occurs. Such thickening occurs at a high pH and therefore alkali was added in amount substantially in excess of that required to neutralize and fluidize deflocculate the acidic flocculated pulp of bleached clay. Such addition of alkali to an acidic pulp of zinc hydrosulfite clay in order to render the clay highly alkaline and to flocculate the slip represents the antithesis of the method of the present invention in which the quality of an alkaline borate salt which would be incorporated must be insufficient to neutralize the clay pulp and is but a fraction of the amount which would be needed to thicken it. For example, I found that about 50 pounds of borax was required to thicken a bleached acidic pulp of Georgia kaolin clay containing 100 pounds of the clay. After addition of the borax, the resulting pulp could not be prepared into a high solids fluid slip even when controlled amounts of condensed phosphate dispersant had been added. In contrast, only 0.5 pounds of borax, when added in accordance with the principles of the present invention, resulted in the desired improvement in pigment opacity without adversely affecting rheology.

DETAILED DESCRIPTION

Practice of the method of the invention has produced noteworthy results with extremely fine kaolin clays, exemplified by degritted kaolin clay obtained from hard crudes and having an average particle size below 0.5 micron, equivalent spherical diameter. Application of the invention to a coating fraction from such crude (0.3 micron average equivalent spherical diameter) has resulted in a pigment having opacifying properties comparable to that of a high brightness coating fraction (0.55 average particle size) from a soft crude. Gloss and pick were also improved. In order to obtain a comparable improvement in opacity with the hard clay without incorporating borate ions, it was necessary to blend the clay with 4 percent by weight of titania.

Bleached mechanically ground coarse kaolin, such as a coarse size fraction of Georgia kaolin clay which has been ground with a sand grinding medium, has also been benefited. Improvement in opacity has also been achieved with various fine size fractions of kaolin clay from soft Georgia kaolin clay crudes.

Different compounds may be used as sources of polyvalent metal cations and borate ions. For example, an acid soluble salt or oxide or hydroxide of a polyvalent metal such as zinc, calcium, barium, strontium, aluminum, titanium, thorium, or combinations thereof, may be added to an acidic pulp of clay followed by the addition, before filtration or after filtration and washing, of a source of borate ions. In this case, the source of polyvalent cations would usually be added in amount of 0.1 percent to 1 percent of the clay weight and the source of borate ions in amount of 0.1 percent to 1 percent of the clay weight. (Weights of clay and additives are expressed on a hydrated weight basis.) When practicing this embodiment of the invention it will be preferable to use a borate compound which itself does not contain polyvalent cations, e.g., sodium or other alkali metal borate, ammonium borate, boric acid or mixtures thereof. Alkali metal (sodium, potassium and lithium) and ammonium borates, especially ammonium biborate, are preferable to borate salts of polyvalent metals because they do not introduce cations which may interfere with the rheological properties of the clay product. Similarly, boric acid does not introduce potentially interfering cations. Further, boric acid will not increase pH significantly, as will alkaline borate salts; therefore, the use of boric acid will avoid a subsequent acidification step which may be necessary in order to filter clay treated with alkaline borate salts. In some cases, boric acid provides the additional benefit of improving the brightness of the clay. Mixtures of borate compounds, exemplified by mixtures of boric acid and borax, may be employed. Borax is preferred for reasons of economy. Boric oxide may be excessively costly.

Using the preferred zinc hydrosulfite in bleach-effective quantity, e.g., 2 to 15 lbs./ton clay, as the sole source of added polyvalent cations with alkali metal or ammonium borate or boric acid, the filtered, washed clay should analyze 100 to 1000 p.p.m. zinc (acid soluble). Generally we prefer to provide treated clay containing 200 to 600 p.p.m. zinc in acid-soluble form.

The boron content of the clay will vary, for any given amount of addition of the source of borate ions, with the point of addition of the source of the borate ions. When added before filtration, as in the preferred embodiment of the method of the invention, the boron content of the filtered, washed clay will represent a fraction of the amount of the borate additive which was used because a substantial amount of the borate ions will be removed from the clay during filtration and washing. Surprisingly, the clay will be improved in opacity even though the amount of boron detectable in the finished clay product is minimal, typically about one-tenth of the boron content of the borate additive. All of the boron present in the borate additive will be present in the product when the borate compound is added after filtration and washing.

A single compound may be used as the source of both polyvalent cations and borate ions provided such compound is added to the clay suspension before filtration. Examples are borate salts of the following metals: aluminum, zinc, magnesium and calcium. When using a polyvalent metal borate salt as the source of both polyvalent metal cations and borate ions, from about 0.5 percent to 2 percent of salt is used. Mixtures of polyvalent metal cation salts can be used in this manner.

When polyvalent cations and/or borate ions are used in excessive amounts, the rheology of the clay will be adversely affected.

When the source of polyvalent cations and borate ions are added before filtration and washing, the acidic washed filter cakes may be deflocculated in conventional manner by adding a strong clay dispersant, usually a condensed phosphate salt such as tetrasodium pyrophosphate or sodium hexametaphosphate. The cakes can be dried or they may be undried when the dispersant is added. A synthetic organic polyanionic dispersant may be used alone or together with the phosphate. Generally, a conventional amount of deflocculating agent is used (e.g., 0.1 percent to 0.5 percent of the clay weight). This will increase the pH of the clay system to 6 or above. Additional alkali such as sodium hydroxide or ammonium hydroxide may be added further to increase pH.

When the polyvalent cations are added before filtration and the borate ions are added after filtration, the borate ions should be added before all of the strong dispersant, such as condensed phosphate salt, has been added, as described in some of the ilustrative examples.

It is also within the scope of the invention to dry and pulverize an acidic, dewatered, washed clay processed with the sources of polyvalent borate ions and cations. The resulting clay product would then be mixed with water and deflocculating agent by the user.

In preparing coating colors, conventional adhesives or mixtures of adhesives may be used with the deflocculated clay. The adhesive functions to bind the clay particles to the substrate. Examples of adhesives are synthetic latices, e.g., styrene-butadiene, acrylics, starch (cooked or raw) and casein. The adhesives are formed into aqueous suspensions or dispersions before they are mixed with the deflocculated slip of borate-treated clay. When using casein, the usual practice of precooking the casein in the presence of ammonia (or source of ammonia) is followed. The effectiveness of the borate additive on coated film properties tends to be minimized as the starch level of the binder increases or when high concentrations of cationic adhesives are employed.

Conventional proportions of pigment and adhesive may be used. If desired, blends of the borate-treated kaolin clay with other pigments such as conventionally processed kaolins, satin white, calcium carbonate and titanium dioxide may be employed.

The following examples are given for illustrative purposes. The invention is not limited, however, to the use of the specific clays and adhesives that were employed.

In the examples, test results were obtained by the following TAPPI (Technical Association of the Pulp and Paper Industry) procedures:

75° gloss - TAPPI Standard T480 ts-65
B & L opacity - TAPPI Standard T425-M-60
G. E. brightness - TAPPI Standard T452-M-58

In measuring printing properties by the so-called 75° Gloss Ink Holdout Test, the procedure used was one described in a publication by Otto P. Berberich, TESTING PRINTABILITY OF PAPER AND BOARD WITH INK - III, November 1957 IPI. The procedure gives results relative to the printing qualities on a letter press proofpress using halftone printing plates.

The K & N Ink Holdout Test entails applying an excess of heavy bodied black pigmented printing ink to coated paper, removing the excess and ascertaining the contrast between the image and the background.

EXAMPLE 1

This example illustrates the use of ammonium biborate to improve the opacity of coatings pigmented with ultrafine hard kaolin clay. In the example the borate salt was incorporated into a pulp of zinc hydrosulfite bleached clay prior to filtration, washing and deflocculation with a condensed phosphate salt and spray drying.

A hard gray kaolin clay crude from a mine near McIntyre, Georgia was blunged in water, fractionated to about 100 percent minus 2 microns with a mixture of soda ash and sodium silicate, deflocculated and beneficiated by anionic froth flotation with an added calcite reagent. The froth (a concentrate of particles of yellow anatase impurities mixed with particles of the calcite flotation reagent) was separated from the underflow (the dilute slip of purified clay). The reagents and procedure that were used are described in U.S. Pat. No. 2,990,958 to Greene et al.

A sample of the underflow from the flotation cells was flocculated by adding sulfuric acid to a pH below 3. Water was removed from the flocs by decantation. The flocculated suspension of beneficiated hard clay which remained had a solids content of about 22 percent. The pulp was bleached by an oxidation-reduction treatment in the following manner. To 74 pounds of the 22 percent solids acidic clay suspension there was added 18.9 gm. $KMnO_4$ in the form of a 1 percent solution. The suspension was mixed for 1 hour and then it was aged with agitation for 48 hours at room temperature. Zinc hydrosulfite powder was added in amount of 56.6 gm., following which the suspension was agitated for 30 minutes; during this time sulfuric acid was added in increments to maintain the pH at about 3. The suspension was allowed to stand for 60 minutes and then it was divided into three batches: (1) a control (pH 2.9) to which a source of borate ions would not be added; (2) an experimental suspension to which ammonium biborate would be added without adjustment of pH; and (3) a suspension to which ammonium biborate would be added, with addition of sulfuric acid to reduce pH to essentially that of the control. The purpose of providing suspensions with ammonium biborate at the two different pH values was to determine how the effectiveness of the ammonium biborate would vary with pH level.

The ammonium biborate that was used to treat the suspensions (2) and (3) was commercial hydrated ammonium biborate and it was used in both instances in amount of 0.5 percent based on the calculated moisture-free weight of the clay that was present. After addition of the borate salt, the suspensions were agitated for 15 minutes.

The three suspensions were then separately filtered on vacuum filters and each cake was rinsed twice, using 1500 ml. of distilled water for each washing. The specific resistance of the cakes from (1) and (2) were 11.0 $\times 10^3$ ohm-cm.; the specific resistance of the cake from (3) was 14.7 $\times 10^3$ ohm-cm.

Portions of each filter cake were separately dried at 180°F. for 24 hours and the dried cakes were pulverized through a 0.039 inch screen.

Batches of each of the washed filter cakes were then deflocculated with the predetermined optimum proportion of dispersant [0.30 percent TSPP for pulps (1) and (2) and 0.35 percent for pulp (3)]. The deflocculated clay-water was spray dried at about 50 percent solids to produce microspheres. The pH of the deflocculated slips from suspensions (2) and (3) were increased to 9.2 and 10.2, respectively, by adding ammonium hydroxide solution before spray drying.

The apparent high shear and low shear viscosities of the high solids deflocculated slips were then measured. It was found that the addition of 0.5 percent ammonium biborate to a suspension of bleached hard kaolin clay before filtration decreased both the high shear (Hercules) and low shear viscosity of a high solids deflocculated slip of the clay. When ammonium biborate was added and the pH was reduced to that of the control, the high shear viscosity was further reduced. The low shear viscosity was slightly greater than it was when ammonium biborate was added and the pH was adjusted to correspond to that of the control. Thus, clay-water rheology was improved when a small amount of ammonium biborate was added before filtration to a clay suspension which had been bleached with zinc hydrosulfite. Moreover, the improvement could be realized without reducing the pH of the ammonium biborate treated suspension.

Tests were carried out to determine whether the addition of ammonium biborate before filtration would result in the beneficial effects of coated film properties that had been realized when the salt had been added after filtration.

Forty-five percent solids clay coating colors containing a mixture of protein and latex as the binder were prepared with each of the high solids slips. To 340 gm. of each 70.5 percent solids slip there was added 36 gm. of a protein adhesive solution (20 percent solids), followed by mixing for 10 minutes, adding 67.2 gm. of a butadiene-styrene latex at 50 percent solids, mixing for 5 minutes and screening through a 325 mesh screen. Viscosity measurements showed that the high shear viscosities of the three coating colors were similar. However the low shear viscosities of coating colors containing ammonium biborate were less than that of the control.

Each coating color was then coated on a paper rawstock (44 lb. basis weight) at a coat weight of 7 lb./3300 ft.². This rawstock has a high brightness (about 81.3 percent) and high opacity (typically about 90 percent B & L opacity). The high brightness and opacity of the rawstock minimize improvements resulting from coatings per se. The coated sheets were supercalendered (room temperature, about 75°F.) through 2 nips at 500 p.l.i.

Calendered sheets coated with the clays which had been processed with ammonium biborate had higher opacity (about 0.6 percent), increased brightness (0.5 percent), reduced pick and improved gloss when compared to sheets coated with clay without ammonium biborate pretreatment.

EXAMPLE II

The general procedure of Example I was carried out with a different type of kaolin clay pigment, namely a mechanically ground coarse size fraction of soft kaolin clay.

The kaolin clay pigment had been obtained by subjecting a deflocculated pulp of coarse size fraction (about 5 microns equivalent spherical diameter) of a soft Georgia kaolin clay to anionic froth flotation to remove colored impurities from the clay pulp, grinding the beneficiated clay in the deflocculated pulp with sand and recovering a slip containing a fine size fraction of sand-ground, flotation beneficiated clay at least 90 percent by weight of which was finer than 2 microns, e.s.d.

The slip containing the fine size fraction of clay was flocculated with sulfuric acid and bleached at 22 percent solids with zinc hydrosulfite at a pH of 2.5. The suspension was then subdivided into portions.

One portion was filtered and the cake was fluidized by adding TSPP in amount of 0.45 percent based on the moisture-free weight of the clay. The resulting slurry was spray dried at 58.5 percent solids to produce control predispersed microspheres.

Ammonium biborate tetrahydrate was added to another portion of the acidic flocculated suspension of bleached ground clay in amount of 0.5 percent of the moisture-free clay weight before the suspension was filtered, deflocculated with TSPP and spray dried.

It was found that the control clay could be formulated at a maximum solids of 60.8 percent. At this solids level, the optimum proportion of TSPP was 0.35 percent based on the mositure-free clay weight. The clay to which ammonium biborate had been added could be prepared into a 62.2 percent solids deflocculated slip using 0.30 percent TSPP. Both slips had acceptable high and low shear viscosities.

Portions of the microspheres were prepared into conventional coating colors with a starch adhesive. The colors were coated on a paper basestock at about 5 lbs./3000 ft.² coat weight and the coated sheets were dried and supercalendered with 2 nips (75°F.) at 500 p.l.i.

Sheets containing clay processed with 0.5 percent ammonium biborate during makedown had calendered opacities of 91.0 percent, an outstanding increase of 2.2 percent over the control (88.8 percent opacity). The 75° gloss was 44.8 percent when borate was added as compared to a 34.7 percent calendered gloss when borate was not added. Calendered sheet brightness was 71.8 percent when borate had been used during processing and 69.4 percent when no borate salt had been employed.

EXAMPLE III

This example shows the effectiveness of borax and ammonium biborate in improving the properties of a hard clay which had been bleached with sodium hydrosulfite and contained added zinc salt.

The general procedure of Example I was followed with a crude hard clay up to and inclusive of the permanganate oxidation step. Sodium hydrosulfite was used as the reducing bleach reagent in lieu of the zinc hydrosulfite. To incorporate zinc ions, zinc hydrosulfite was dissolved in the pulp of bleached clay in amount of 6.4 lbs./ton of clay in the pulp. The pulp was then divided into three portions - one a control (pH 3); a second to which high purity borax was added in amount of 0.54 percent based on the weight of the clay, followed by addition of sulfuric acid to pH 3.0; and a third to which ammonium biborate hydrate (technical grade) was added in amount of 0.54 percent, based on the weight of the clay, followed by addition of sulfuric acid to pH 3.0. The three pulps were aged overnight, filtered and washed with distilled water to resistances within the range of 8700 to 8900 ohm-cm. The filter cakes were deflocculated by addition of TSPP in amount of 0.30 percent based on the clay weight and the deflocculated slurries were spray dried at 50 percent solids as in Example II. The resulting microspheres were prepared into coating colors with a starch adhesive (18 parts adhesive to 100 parts of clay). The colors were applied to a paper basestock at a coat weight of 8.8 lbs./3300 ft.². The sheets were supercalendered with 2 nips (80°F) at 500 p.l.i.

Sheet properties were measured with the results shown in Table I.

Data in Table I show that borax and ammonium biborate had similar effects on sheet properties when added to bleached hard clay during wet processing and prior to deflocculation. Both alkaline borates increased opacity and brightness (before and after supercalendering). Both increased gloss, decreased pick and improved ink receptivity.

Viscosity studies showed that both borate salts decreased the low shear and high shear viscosity of 70.5 percent solids slurries of the deflocculated clay without adversely affecting the rheology of the coating colors.

TABLE I

EFFECT OF ADDING 0.5 PERCENT OF ALKALINE BORATE SALTS BEFORE FILTERING BLEACHED HARD KAOLIN CONTAINING ADDED ZINC ION

| Sheet Properties | Borate Salt | | |
|---|---|---|---|
| | None | 0.5% Borax | 0.5% Ammonium Biborate |
| Uncalendered | | | |
| B & L opacity, % | 91.7 | 92.3 | 92.2 |
| Brightness, % | 78.2 | 79.2 | 79.4 |
| 75° gloss, % | 12 | 14 | 14 |
| Supercalendered, 2 nips | | | |
| B & L opacity, % | 90.7 | 91.2 | 91.4 |
| Brightness, % | 77.2 | 78.3 | 78.5 |
| 75° gloss, % | 37 | 41 | 42 |
| IGT pick, VVP | 27 | 24 | 19 |
| K & N, Δ % | 30 | 37 | 37 |

EXAMPLE IV

In this example, boric acid was incorporated with a 17.5 percent solids pulp of bleached hard kaolin clay prior to filtering the pulp and deflocculating the filter cake with TSPP.

The pulp of bleached clay was prepared by subjecting a hard gray kaolin crude to the series of steps (including flotation and potassium permanganate-zinc hydrosulfite bleaching) which are described in Example I.

One 3750 gm. portion of the pulp of bleached hard kaolin clay (pH 3.1) was used as a control. This pulp was filtered overnight and the cake was washed with 625 ml. distilled water. The cake was dried overnight at 180°F. for 18 hours and pulverized through a 0.030 inch screen. The brightness of the clay was measured with a G. E. instrument and found to be 89.5 percent.

To another 3750 gm. portion of the flocculated pulp (containing 625 gm. dry clay) there was added 3.13 gm. boric acid (0.5 percent, based on the dry clay weight). The pulp was heated to 160°F. to dissolve the boric acid, mixed for 15 minutes and cooled immediately to 80°F. The pH after addition of boric acid was 3.35, slightly higher than the pH was before boric acid had been added. The pulp was filtered, washed, dried and pulverized. Brightness of the clay was 90.7 percent, an improvement of 1.2 points over the control which had been processed without addition of boric acid.

The two pulverized clays were made down in 70.6 percent solids slips containing optimum amounts of TSPP. The control required 0.55 percent TSPP (based on the clay weight). The experimental clay required 0.50 percent TSPP. The pH values of the control and experimental deflocculated slips were 6.75 and 6.70, respectively. It was found that the boric acid treatment did not adversely affect high shear or low shear viscosity.

The slips were prepared into 50 percent solids starch coating colors by mixing 354.6 gm. slip with 10.0 gm. water and 225.0 gm. of a starch solution at 20 percent solids. The pH of both colors was adjusted to 9.0 by addition of dilute ammonium hydroxide solution. The two coating colors had similar high shear and low shear viscosities. The colors were applied to paper basestock at coat weights of about 6 lbs./3000 ft.$^2$. The basestock had a G. E. brightness of 80.4 percent and a B & L opacity of 86.1 percent. The sheets were supercalendered, 2 nips cold, 500 p.l.i.

The properties of the sheets are summarized in Table II.

The data in Table II show that the clay which had been processed with a source of zinc ions and boric acid, in accordance with the present invention, produced a brighter, more opaque calendered sheet having improved pick resistance and ink receptivity. The improvement in sheet brightness (0.7 point) would be expected to minimize the apparent improvement in opacity. Thus, the 0.8 point apparent increase in opacity would have been even greater if the presence of the experimental clay had not significantly brightened the coated paper.

TABLE II

EFFECT OF INCORPORATING BORIC ACID WITH A PULP OF BLEACHED HARD CLAY ON THE PROPERTIES OF CLAY PIGMENTED PAPER

| | Control | Boric acid added, 0.5% wt. |
|---|---|---|
| Uncalendered sheets | | |
| G. E. Brightness, % | 81.9 | 82.3 |
| 75° gloss, % | 26.2 | 26.6 |
| B & L opacity, % | 89.4 | 90.0 |
| Supercalendered, 2 nips | | |
| G. E. brightness, % | 80.9 | 81.6 |
| 75° gloss, % | 48.5 | 49.6 |
| B & L opacity, % | 88.4 | 89.2 |
| IGT pick, VVP | 33.4 | 39.7 |
| K & N ink, % | 25.0 | 29.3 |

Data in this example therefore demonstrate that the addition of a small amount of boric acid to a pulp of bleached gray clay before filtering the pulp resulted in a remarkably brighter clay pigment. Further, the data show that this brighter pigment resulted in a more opaque, brighter coating having improved printing properties. Also demonstrated is that the use of boric acid during wet processing of clay did not adversely affect rheological properties of the clay.

Examples V to X illustrate embodiment of the invention wherein borate compounds are added during makedown (after filtration) but before addition of substantial phosphate deflocculant.

In Examples V, VI, VIII and IX, filter cakes of bleached hard kaolin were employed. The cakes were obtained by processing hard kaolin clay crudes from a mine near McIntyre, Ga., in the following manner. The crudes were blunged in water, fractionated to about 100 percent minus 2 microns, deflocculated and beneficiated by froth flotation with an anionic collector. In each case the flotation tailings were separated from the froth (a concentrate of yellow anatase impurity) and the tailings were thickened by adding acid to flocculate the clay and remove water from the flocs. The flocs were then bleached by adding potassium permanganate solution and then zinc hydrosulfite solution in the presence of sulfuric acid, as described in Example I. The bleached beneficiated hard clay was filtered and washed. In some cases undried acidic filter cakes were used as starting materials. In other examples, samples of the acid cakes were dried and pulverized in a high speed hammer mill before makedown.

In Example VII, a filter cake of high brightness, flotation beneficiated zinc hydrosulfite bleached soft kaolin clay (No. 1 clay) was employed. The processing is described in U.S. Pat. No. 2,990,958 to Greene et al.

In Example X a filter cake of zinc hydrosulfite bleached sand-ground coarse soft kaolin was used. The steps involved in grinding and bleaching are described in Example II.

EXAMPLE V

This example demonstrates desirable effects of adding a small amount of ammonium biborate to filtered hard clay during makedown.

A sample of dry, acidic filter cake was added to water containing ammonium biborate hydrate. The clay was added with continuous mixing until further addition produced a mixture that was too viscous to handle. The mixture was then fluidized by adding TSPP in small increments (0.05 percent of the moisture-free clay weight), adding more clay, then adding increments of TSPP until the system was fluidized. The sequential addition of clay and dispersant was repeated until a 70.5 percent solids deflocculated clay slip was obtained. The pH was adjusted to 8.8 by addition of ammonium hydroxide. The quantity of ammonium biborate hydrate present in the slip was 0.5 percent based on the moisture-free clay weight. TSPP was present in amount of 0.30 percent of the moisture-free clay weight.

A control of 70.5 percent solids slip was made by using another sample of the same filter cake and an optimum proportion of dispersant (0.45 percent of the moisture-free clay weight). Again pH was adjusted to 8.8. The viscosity of this slip was similar to that of the slips containing ammonium biborate.

Experimental and control coating colors were separately prepared by mixing 312 gm. each of 70.5 percent solids clay slip with 165 gm. distilled water, 33 gm. protein adhesive solution (20 percent solids) and 61.6 gm. styrene-butadiene latex at 50 percent solids. Each color contained 45 percent solids.

The coating colors were coated on the rawstock of Example IV to a coat weight of 7 lbs./3000 ft.$^2$ and the sheets were cold calendered, 2 nips, 500 p.l.i.

A summary of the optical and printing properties of the coated sheets appears in Table III.

TABLE III

EFFECT OF AMMONIUM BIBORATE DURING MAKEDOWN ON OPTICAL AND PRINTING PROPERTIES OF PAPER COATED WITH HARD KAOLIN

| Property | Coating Composition | |
| --- | --- | --- |
|  | Control (no borate salt) | Experimental (0.5% NH$_4$-borate added) |
| 75° gloss, % | 52.7 | 55.8 |
| B & L opacity, % | 90.4 | 91.7 |
| Brightness, % | 81.4 | 82.1 |
| Δ K & N ink holdout, % | 27.4 | 32.3 |

Data in Table III show that when ammonium biborate was added during makedown the clay-coated paper was glossier, more opaque and brighter. Results of printability tests indicate the coated sheets prepared with ammonium biborate addition during makedown had better gloss ink holdout and K & N ink receptivity.

EXAMPLE VI

A 56.0 percent solids slurry of the bleached beneficiated hard kaolin clay was prepared by agitating an undried filter cake with ammonium biborate hydrate in amount of 0.50 percent of the dry weight of the clay. Tetrasodium pyrophosphate was added in amount of 0.35 percent of the clay weight and then ammonium hydroxide was added to bring the pH to 10.6. The slurry was spray dried with an air inlet temperature of 340°C. to 350°C. and an air outlet temperature of 125°C.

The predispersed microspheres were prepared in a high solids (70.7 percent) slip by agitating the microspheres in water.

A 60.4 percent solids coating color was prepared by diluting the 70.7 percent solids dispersed slip with water to 60.3 percent solids, mixing and then adding a styrene-butadiene latex suspension (50 percent solids) in amount corresponding to 18 parts by weight latex solids to 100 parts by weight clay solids.

A control coating color without ammonium borate salt was prepared from predispersed hard clay obtained by slurrying another portion of the same filter cake in water containing 0.45 percent TSPP (based on the dry clay weight) and spray drying the slurry. The pH of the control was adjusted to a pH of 8.0 by addition of ammonium hydroxide solution.

The control coating color and the experimental coating color containing ammonium borate were separately coated on five black glass plates as described in an article by G. A. Hemstock and R. J. Bergmann, STUDIES OF RELATIONSHIPS BETWEEN SUSPENSION AND PAPER COATING FILM PROPERTIES, TAPPI, Nov. 1968, Vol. 511, No. 11, pages 489 to 496. Gloss measurements (75°) were made with a gloss meter and brightness was obtained with a brightness meter. Coat weight of the coat on each plate was determined. From the value of the reflectance of the coating over a black body and the coat weight on the plate the scattering coefficient("$s$") was computed using the equation given at page 491 in the TAPPI article by Hemstock et al. (supra). Means scattering coefficients were calculated from the "$s$" values for the five plates.

The mean scattering coefficient of the coatings prepared with predispersed hard clay containing 0.5 percent by weight ammonium biborate was 0.14 ream/lb. The mean scattering coefficient of the coatings without ammonium biborate was 0.10 ream/lb. A comparison of the results shows that the use of ammonium borate resulted in a clay coating having a significantly greater scattering coefficient and thus more reflecting interfaces. Since opacity is proportional to scattering coefficient, the results indicate that ammonium biborate will markedly improve the opacity and hiding power of the clay coating. This was confirmed by visual comparison of heavy coat weight drawdowns prepared with the two coating colors.

EXAMPLE VII

The general procedure of Example VI was repeated with a commercial, high brightness, flotation beneficiated, bleached (zinc hydrosulfite) soft Georgia kaolin clay in pulverized acidic form. The scattering coefficient of a clay-coated black glass plate obtained with the coating color containing clay that had been pretreated with ammonium biborate was 0.19 ream/lb. The value for a control was 0.12 ream/lb. Thus, processing the clay with ammonium biborate improved significantly the hiding power of the clay pigment.

EXAMPLE VIII

A filter cake of minus 1 micron floated, bleached hard clay was dried and pulverized. A suspension of ammonium biborate was obtained by mixing 5 gm. boric acid with 40 ml. 28° Be. ammonium hydroxide, heating in an open container in a 160°F. water bath for 3 minutes and cooling. This suspension was then dissolved in water and the pulverized hard clay was added to the resulting solution until the slurry was no longer workable, using 0.5 part by weight of the slurry of ammonium borate to 100 parts by weight clay. As in Example V, TSPP was added in increments, followed by additional increments of clay. The resulting deflocculated clay slip contained TSPP in amount of 0.15 percent based on the dry clay weight and was at 60.6 percent solids.

An experimental coating color (45 percent solids) was formulated by mixing the deflocculated clay-water suspensions containing the ammonium borate suspension with adhesive suspensions and distilled water. The pH of the coating color was 8.8. The coating color contained 100 parts by weight hard kaolin clay, dry clay basis, 14 parts by weight styrene-butadiene latex at 50 percent solids, and 3 parts by weight of protein adhesive cut with 12 percent ammonium hydroxide solution.

A control coating color was prepared by dispersing another portion of the same clay filter cake with 0.30 percent TSPP to form a 70 percent solids suspension and mixing the suspension with the adhesives and ammonium hydroxide to provide a composition having a total solids content of 45.0 percent and a pH of 8.8. Thus, the control and the experimental coating colors had the same pH and essentially identical solids content but differed in that the clay in the experimental color had been pretreated with ammonium biborate before being deflocculated with the sodium condensed phosphate.

Rheological properties of the two coating colors were compared. It was found that the coating color containing clay makedown with ammonium borate was strikingly lower in viscosity than the experimental color having the same solids content and pH.

Each color was coated on the felt side of the rawstock of Example IV at a coat weight of 7 lbs./3000 ft.$^2$. After the colors were coated on the rawstock, the coated sheets were drum dried. Some of the sheets were then calendered at 75°F. (2nips) under a pressure of 500 lb. per linear inch. Other sheets were calendered with 4 nips. Sheet properties were measured before and after the calendering. Results are summarized in Table IV.

Gloss data in Table IV show that when ammonium biborate was added to the hard clay coating pigment during makedown, the coated paper was glossier than the sheet coated with the same clay coating without ammonium borate. Calendering normally minimizes differences in gloss. However, even after calendering with 4 nips, the coating containing ammonium borate was still significantly glossier.

Opacity data in Table IV show that the addition of ammonium borate resulted in an increase in opacity which was especially pronounced after calendering. If a less opaque rawstock had been used, a greater improvement in opacity would have been noted.

A comparison of K & N ink holdout data for the experimental and control coated sheets shows that the addition of ammonium borate increased ink absorption.

Data in Table IV show also that the ammonium borate slightly increased pick resistance, thus improving the bond of the coating to the paper.

TABLE IV

EFFECT OF ADDING AMMONIUM BIBORATE DURING MAKEDOWN ON THE PROPERTIES OF PAPER COATED WITH HARD KAOLIN CLAY

| Sheet properties | Control (No NH$_4$-Borate) | Experimental (with 0.5% NH$_4$-Borate) |
|---|---|---|
| Uncalendered coated sheets | | |
| G. E. brightness, % | 84.7 | 86.5 |
| 75° gloss, % | 22 | 30 |
| B & L opacity, % | 92.9 | 93.0 |
| Calendered coated sheets (2 nips) | | |
| G. E. brightness, % | 82.9 | 83.1 |
| 75° gloss, % | 56 | 64 |
| B & L opacity, % | 91.8 | 92.1 |
| IGT pick resistance | 17 | 19 |
| Δ K & N ink holdout, % | 28 | 34 |
| Calendered coated sheets (4 nips) | | |
| G. E. brightness, % | 82.9 | 82.2 |
| 75° gloss, % | 66 | 72 |
| B & L opacity, % | 90.8 | 91.7 |
| IGT pick resistancne | 17 | 19 |
| Δ K & N ink holdout, % | 24 | 29 |

EXAMPLE IX

This example illustrates the addition of sodium polyborate and ammonium biborate during the makedown of bleached hard clay pigment to improve the printing properties of paper coated with the clay.

Fifteen gm. borax was added to 5 gm. boric acid in 20 gm. distilled water. The mixture was heated to 150°F. and cooled. Repeating the procedure described in Example V, the resulting aqueous reaction product was added during makedown to a filter cake of bleached hard clay using 1 part reaction product (including water) to 100 parts by weight clay. The makedown procedure of Example V was followed using TSPP as the deflocculating agent.

The procedure was repeated, adding 0.5 percent ammonium biborate for purposes of comparison.

A control experiment was carried out in which a borate compound was not incorporated during processing.

The three deflocculated slurries were prepared into 45 percent solids coating colors by mixing them with a suspension containing three parts by weight protein adhesive and 14 parts by weight styrene-butadiene latex. The coated sheets were calendered with 2 nips.

The clay processed with ammonium biborate and the reaction product of boric acid and borax produced calendered (Oxford basestock) that were 0.8 and 0.9 point higher in opacity than the sheets prepared with the control clay. The sheets containing the ammonium biborate-treated clay were 0.5 percent brighter than the control sheets. The sheets coated with clay processed with the borax-boric acid reaction product were 1.6 points higher in brightness. All sheets containing borate additive had improved pick.

EXAMPLE X

This example illustrates the desirable effects of adding a small amount of zinc borate to an acidic filter cake of bleached, sand-ground coarse kaolin (Example II) before dispersing the cake with a condensed phosphate salt.

The procedures of Example V were followed with portions of the filter cake. To one portion of the acidic cake, commercial zinc borate (3 $ZnO \cdot 2B_2O_3$) was added in amount of 1.0 percent of the clay weight during makedown. To another portion of the cake ammonium biborate was added in amount of 0.5 percent of the clay weight. No borate compound was incorporated in the control. A basestock of the type used in Example II was used in preparing coated sheets.

The results, summarized in Table V, show that zinc borate and ammonium biborate produced comparable improvements in opacity, brightness and gloss.

While the invention has been described with emphasis on effecting improvements in kaolin pigments for coating paper, it is apparent that some of the benefits, especially the improvement in opacity, may be realized when the borate-treated kaolin is employed as a pigment in other coatings, e.g., paints, especially latex paints.

TABLE V

EFFECT OF ADDING ZINC BORATE OR AMMONIUM BORATE TO SAND GROUND KAOLIN CLAY DURING MAKEDOWN

| | Borate Salt | | | | |
|---|---|---|---|---|---|
| | Control (no borate salt) | 0.5% Ammonium Biborate | | 1.0% Zinc Borate Commercial Grade | |
| Basestock | | | | | |
| Coat weight, lbs./3300 ft.² | 5.8 | 5.4 | Δ | 5.6 | Δ |
| Uncalendered | | | | | |
| Opacity, % | 89.9 | 91.8 | 1.9 | 91.9 | 2.0 |
| Brightness, % | 71.6 | 73.8 | 2.2 | 74.1 | 2.5 |
| 75° gloss, % | 9.1 | 12.1 | 3.0 | 11.7 | 2.6 |
| Calendered | | | | | |
| Opacity, % | 88.8 | 91.0 | 2.2 | 91.0 | 2.2 |
| Brightness, % | 69.4 | 71.8 | 2.4 | 72.3 | 2.9 |
| 75° gloss, % | 34.7 | 44.8 | 10.1 | 41.9 | 7.2 |

Δ = increase

I claim:

1. In the wet processing of kaolin clay to produce a clay coating pigment wherein kaolin clay is provided in the form of an acidic flocculated aqueous pulp which is filtered to remove acidic pulp water and the filtered clay is washed to provide an acid clay filter cake amenable to deflocculation with a clay dispersant, the improvement, whereby the opacifying power of the clay is increased without adversely affecting the clay rheology, which improvement comprises mixing into said acidic flocculated pulp, before the pulp is filtered, a small amount of a colorless source of polyvalent metal cations and a small amount of a colorless source of borate ions, said sources being added in amounts insufficient to neutralize or to deflocculate the pulp but being sufficient to improve the opacity of coatings pigmented with the clay.

2. The method of claim 1 wherein the borate compound is borax added in amount within the range of 0.1 percent to 1 percent of the weight of the clay.

3. In the wet processing of kaolin clay to produce a clay coating pigment wherein kaolin clay is provided in the form of an acidic flocculated aqueous pulp which is filtered to remove acidic pulp water and the filtered clay is washed to provide an acid clay filter cake and the filtered clay is dispersed by adding a strong clay dispersant, the improvement, whereby the opacifying power of the clay is increased, which comprises mixing a small amount of a colorless source of metal polyvalent cations into the acidic pulp before it is filtered and mixing a small amount of a colorless source of borate ions into the filtered, washed, acidic clay before adding all of the clay dispersant, the amount of the source of the borate ions being insufficient to neutralize or to deflocculate the acidic clay but being sufficient when used in combination with said source of polyvalent cations to improve the opacity of coatings pigmented with the dispersed clay.

4. The method of claim 3 wherein the borate compound is borax added in amount within the range of 0.1 percent to 1 percent of the weight of the clay.

5. The method of claim 3 wherein said dispersant is a condensed phosphate salt.

6. A predispersed kaolin clay coating pigment comprising kaolin clay particles mixed with a small amount of a colorless source of polyvalent cations and a small amount of a colorless source of metal borate ions in amounts insufficient to neutralize or to deflocculate the clay but sufficient to improve the opacity of coatings pigmented with the clay, and a clay dispersant in amount sufficient to deflocculate the clay.

7. The pigment of claim 6 wherein said borate compound is borax.

8. The pigment of claim 6 wherein said dispersant is a sodium condensed phosphate.

9. A predispersed kaolin clay coating pigment comprising particles of bleached kaolin clay containing added acid-soluble colorless polyvalent metal cations in amount within the range of 200 to 600 p.p.m., from 0.1 percent to 1 percent by weight of borax, and froom 0.1 percent to 0.5 percent of a sodium condensed phosphate salt.

10. The pigment of claim 9 wherein said kaolin clay is a fine size fraction of a hard kaolin clay crude.

11. The pigment of claim 9 wherein said kaolin clay is a fine size fraction of a soft kaolin clay crude.

12. The pigment of claim 9 wherein said kaolin clay is a fraction of mechanically ground coarse soft kaolin clay.

13. A kaolin clay coating pigment consisting essentially of particles of kaolin clay containing an added colorless source of polyvalent metal cations and an added colorless source of borate ions in amounts insufficient to neutralize or to deflocculate the clay but sufficient to improve the opacity of the clay, said pigment being acidic and capable of being deflocculated with a sodium condensed phosphate clay dispersant to form a high solids deflocculated clay-water slurry having acceptable rheology for formulation in a paper coating composition.

* * * * *